INVENTORS
N.H. Dieter, Jr.
E.H. Bauer by Greene, Pinckney & Dunn
ATTORNEYS

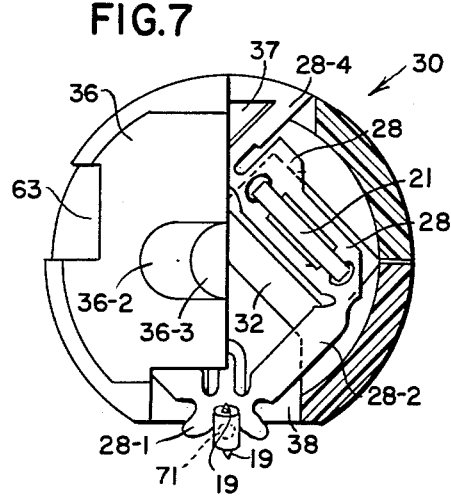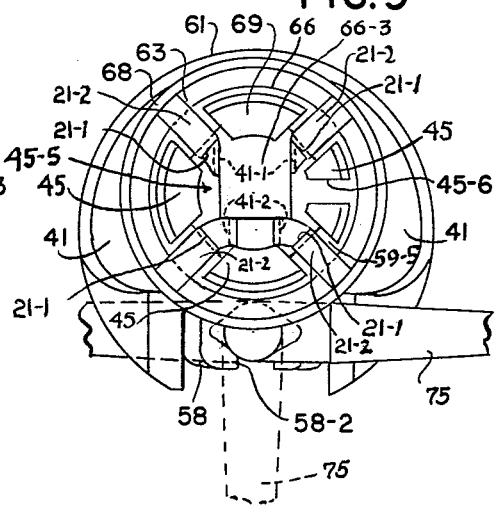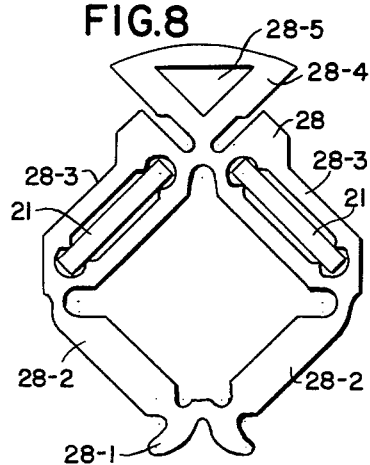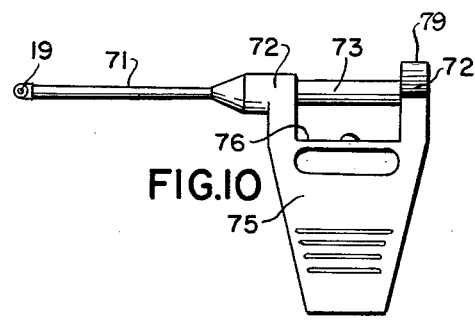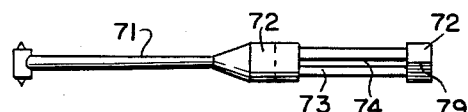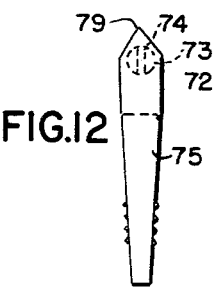
INVENTORS
N.H. Dieter, Jr.
E.H. Bauer
ATTORNEYS

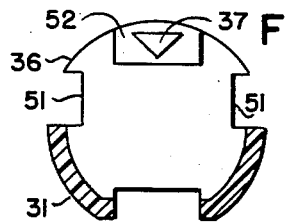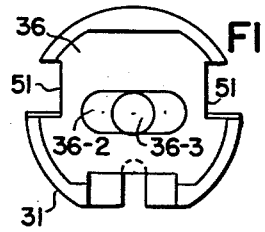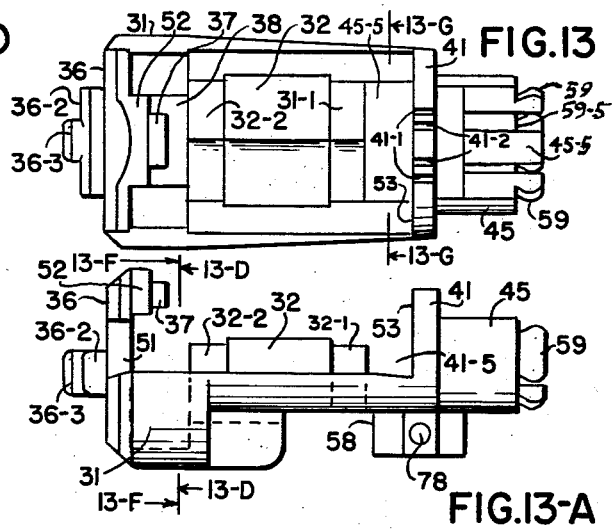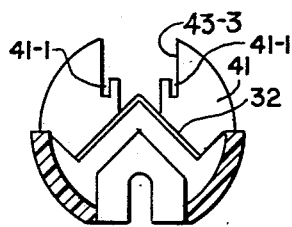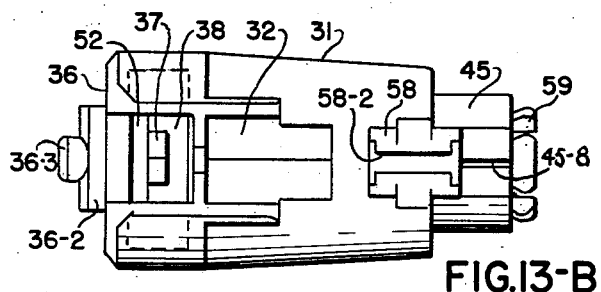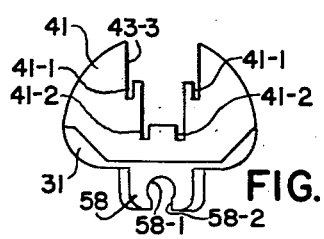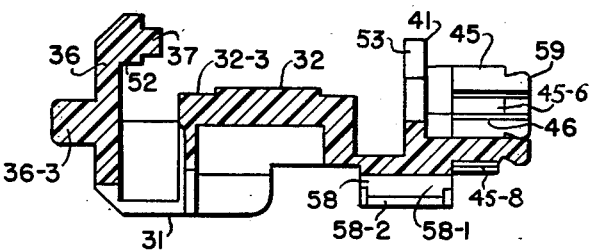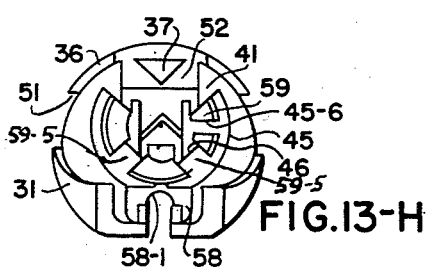
INVENTORS
N.H. Dieter, Jr.
E.H. Bauer

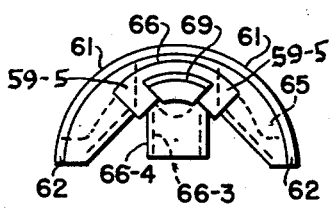
FIG.14-B
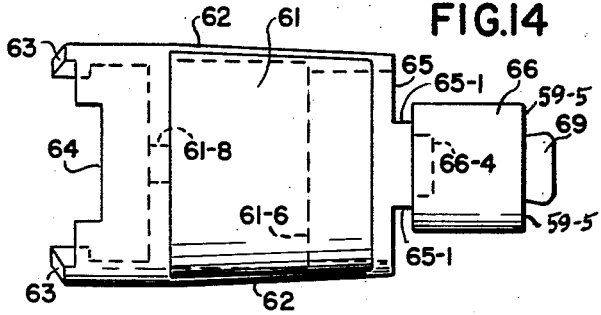
FIG.14
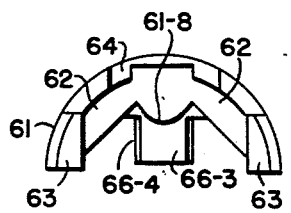
FIG.14-C
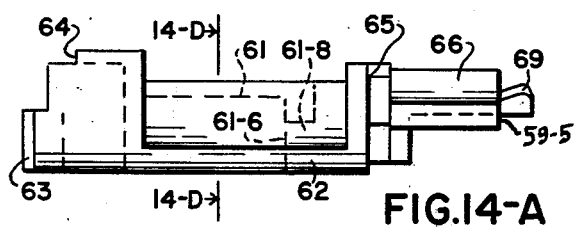
FIG.14-A
FIG.14-D
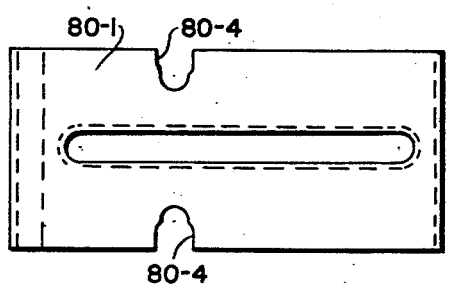
FIG.15
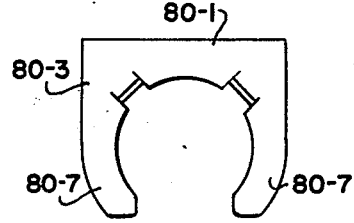
FIG.15-B
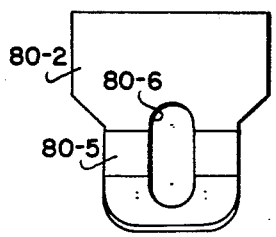
FIG.15-A
INVENTORS
N.H.Dieter, Jr.
E.H.Bauer
ATTORNEYS

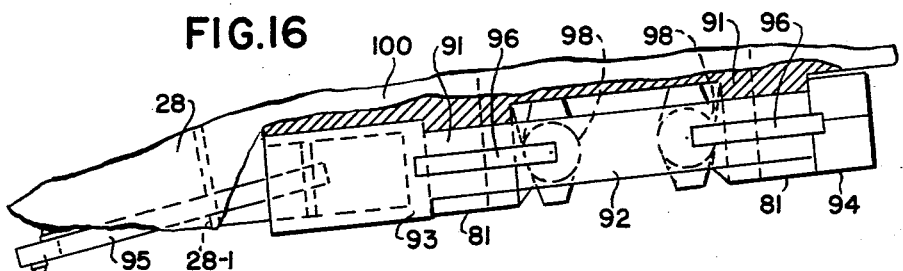
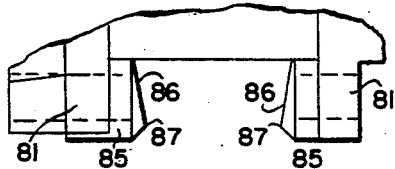
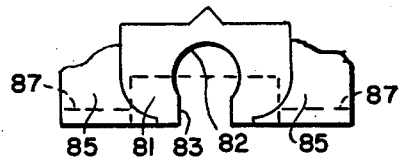
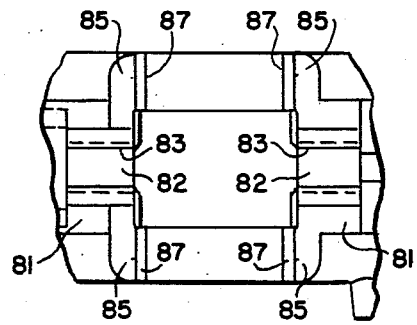

United States Patent Office 3,182,136
Patented May 4, 1965

3,182,136
PHONOGRAPH PICKUPS WITH DETACHABLY REPLACEABLE STYLUS DRIVE STRUCTURE
Norman H. Dieter, Jr., Pleasantville, and Egon H. Bauer, Yonkers, N.Y., assignors to Sonotone Corporation, Elmsford, N.Y., a corporation of New York
Filed Nov. 19, 1962, Ser. No. 238,674
9 Claims. (Cl. 179—100.41)

This application is a continuation in part of the co-pending application Serial No. 49,358, filed August 12, 1960, and now abandoned.

This invention relates to phonograph pickups which are utilized for transducing record-groove undulations into corresponding electric signals. Although some of the features of invention hereof are applicable to phonograph pickups designed for playing back signals of one type of groove only, for instance microgrooves, and many features of invention hereof are applicable for playing back groove undulations having recorded therein only a single signal sequence, the present application discloses its various inventive features in connection with a phonograph pickup designed for playing back two related record sequences, such as stereophonic record sequences, recorded on different transverse segmental regions of the record groove, for instance the "45—45" record system such as described, for instance, in Keller et al. Patent No. 2,114,471.

One phase of the present invention is directed to a phonograph pickup operating with a detachable, non-turnable stylus drive member for playing back signals of only one type of groove, or with a turntable stylus drive member having two styli for playing back records from two types of record grooves, as described, for instance, in Klingener U.S. Patent 2,717,929, assigned to the assignee of the present application.

Among the objects of the invention is a stylus drive structure designed for detachable positioning in the pickup for operation in either one of two stylus positions, or in only a single stylus position, and which is of greatly simplified structure and is more effective in holding the stylus in the desired operative position on the pickup, than in heretofore known arrangements. In accordance with this phase of the invention, a self-supporting, elongated stylus drive structure carrying at least one stylus on a portion thereof, has a relatively stiff seating section of elastically deformable substance with two side-wall portions elastically biased to retain a normal seating width with which it is retained in operative position on the pickup, with the side-wall portions being elastically deformable to give them a narrower width than their normal width, for enabling ready removal from or replacement of the stylus drive structure in its operative position in the pickup. In accordance with a phase of the invention, such stylus drive structure is arranged to carry two styli and for being turned around its axis for bringing either one of the styli into the record playing position.

Among other objects of the invention is a phonograph pickup of simplified construction, the various elements of which, including the transducer, the stylus, the stylus coupling connection to one or two transducers, are held assembled in operative position in a multi-wall housing without requiring special junction elements such as rivets, screws or the like, for joining the housing parts around the assembled housing elements. In accordance with the invention, a pickup operating with one or two transducers, in the case, for instance, of a stereophonic pickup, and all other associated operating elements of the pickup, are held assembled in their operative positions within a housing having two complementary walls which are held joined to each other by two opposite sets of complementary end-wall portions, with at least one wall portion of one of the two housing walls being elastically deformable for deforming it to a releasing position wherein at least one of the two housing walls may be separated from its joined, assembled position.

The foregoing and other objects of the invention will be best understood from the following description of exemplifications thereof, reference being had to the accompanying drawings, wherein:

FIG. 7 is a front end view of the pickup of FIGS. 1–3, with one half of the front housing end-wall portions broken away to expose the front view of the internal transducer and stylus assembly;

FIG. 8 is a front view of the transducer and stylus coupler assembly;

FIG. 9 is a rear end view of the pickup of FIGS. 1–4;

FIG. 10 is a side view of the detachable stylus drive structure as seen from the top in one of its two different or opposite stylus positions;

FIG. 11 is a side view of the stylus drive structure as seen from the top of FIG. 10;

FIG. 12 is a rear end view of the stylus drive structure as seen from the right of FIG. 10;

FIG. 13 is a top view of the bottom housing wall exposing its interior aligning surfaces for assembling and aligning the different interior components of the pickup in their operative relation;

Figure 1:
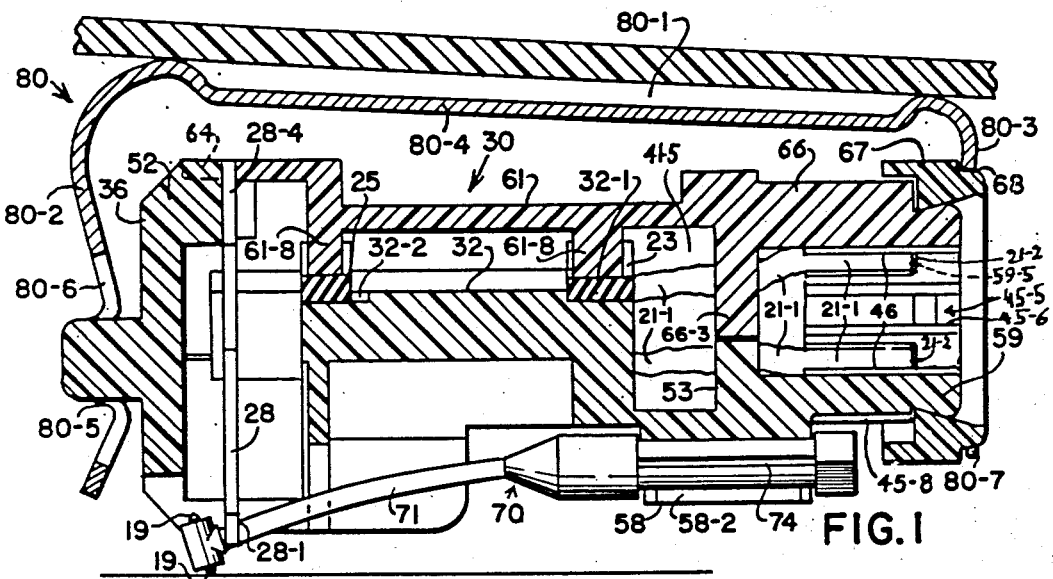
FIG. 1 is a vertical, cross-sectional view of one form of a pickup of the invention, operating with two styli and with one of its styli held in a groove-scanning playback position.
Figure 20:
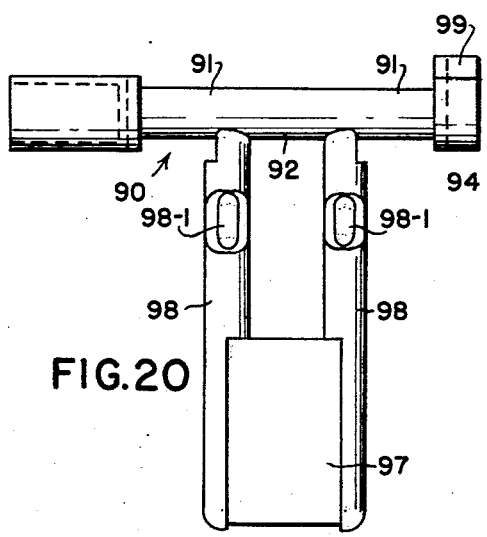
Figure 21:
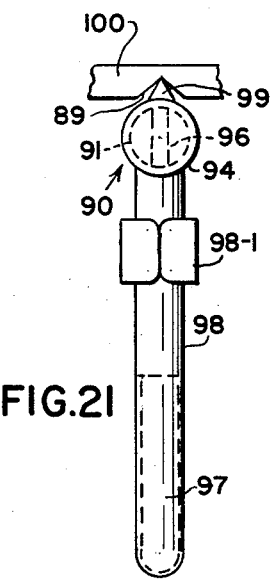
Figure 22:
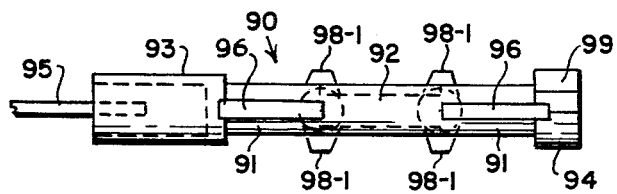

FIG. 13–A is a side view and FIG. 13–B is a bottom view of the bottom housing wall of FIG. 13;

FIG. 13–C is a cross-sectional view of the bottom housing wall along line 13–C—13–C of FIG. 13;

FIG. 13–D is a cross-sectional view of the same housing wall along line 13–D—13–D of FIG. 13–A;

FIG. 13–E is a front end view of the same housing wall;

FIG. 13–F is a cross-sectional view of the same housing wall along line 13–F—13–F of FIG. 13–A;

FIG. 13–G is a cross-sectional view along line 13–G—13–G of FIG. 13;

FIG. 13–H is a rear end view of the same housing as seen from the right of FIG. 13;

FIG. 14 is a top view of the top housing wall of the pickup;

FIG. 14–A is a side view of the top housing wall of FIG. 14;

FIG. 14–B is a rear end view of the same housing wall as seen from the right of FIG. 14–A;

FIG. 14–C is a front view of the housing wall as seen in FIG. 14–A;

FIG. 14–D is a cross-sectional view along line 14–D—14–D of FIG. 14–A;

FIG. 15 is a top view of the supporting bracket of FIG. 1;

FIG. 15–A is a front view and FIG. 15–B is a rear view of the same supporting bracket;

FIG. 16 is a view similar to FIG. 1 of a similar type of pickup operating with a different type of stylus drive member;

FIG. 17 is a view similar to FIG. 16 of the left portion of the same pickup, with the stylus drive member removed therefrom;

FIG. 18 is a rear end view of the housing portion of the same pickup, as seen from the right end of FIG. 16;

FIG. 19 is a bottom view of the housing portion shown in FIG. 17;

FIG. 20 is a top view of the stylus drive member of the pickup of FIG. 16, as it would be held in operative position thereon, with the stylus-carrying front end broken away; and FIG. 21 is an end view and FIG. 22 is a side view of the same stylus drive member.

FIGS. 1 to 4 show the complete structure, and FIGS. 5 to 15–B show the details, of one form of phonograph pickup exemplifying the invention. Although it may operate with any known mechano-electric transducers, such as electromagnetic or electrodynamic transducers, the pickup shown is designed for operation with piezoelectric transducers, the features of the invention being readily adapted for operation with any other types of transducers. The pickup shown is of the stereophonic type, and it has two conventional, elongated, piezoelectric transducers 21, for instance in the form of a piezoelectric bilaminate having exterior metallic electrode surfaces, as disclosed in Crownover et al. Patent 2,769,867.

Figure 3:
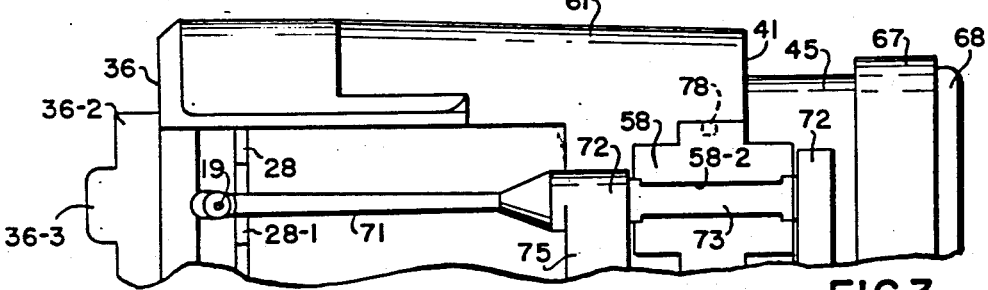
FIG. 3 is a bottom view of the pickup of FIGS 1 and 2.
Figures 4, 5, 6:
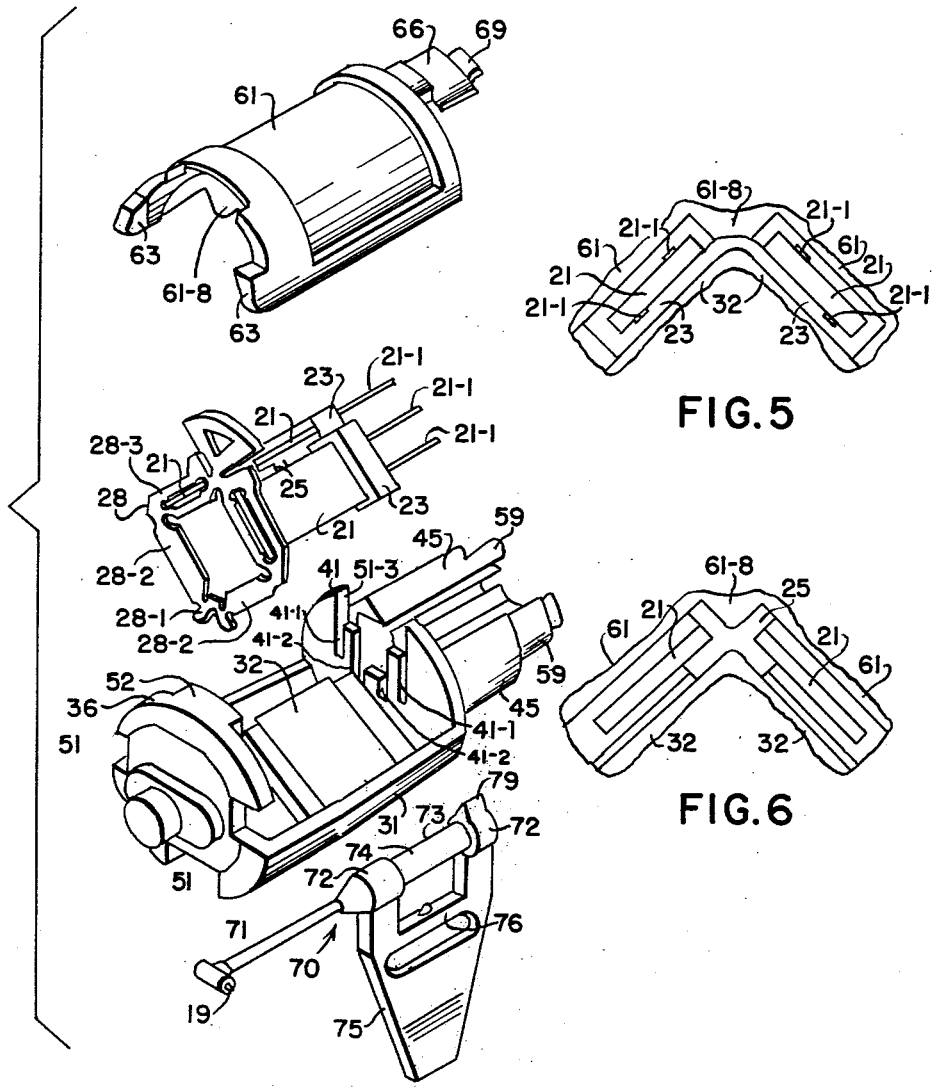
FIG. 4 is an exploded view of the principal different cooperating elements of the pickup of FIGS. 1–3.
FIG. 5 is a front end view of the two transducers with their rear elastomer body portions held clamped by the adjoining housing portions.
FIG. 6 is a front end view of the two transducers with their forward elastomer body portions held clamped by the adjoining housing portions.

The piezoelectric transducers 21 shown are of the twister type, which generate an electric signal output in response to a torsional vibratory motion imparted to their forward portions, although the transducers 21 may be of the bender type, in which case a bending motion is imparted to their forward, movable portions. The rearward part of each transducer 21 is shown held restrained in motion by elastomer body portions 23 of elastomer material, which embrace or surround all or the major rearward transducer surface portions. As shown in detail in the view of FIG. 5, the two rearward elastomer body portions 23 of the two transducers 21 form an integral body, being joined by a junction body portion 24 of the same elastomer material. The forward end of each of the two transducers is connected to the stylus by an endless-chain, motion-resolving and motion-transmitting stylus coupler 28. The stylus coupler 28 shown is of the type disclosed and claimed in Dieter Patent 2,934,610, and it comprises a stylus-coupling portion 28–1 engaged by the stylus, two drive arms 28–2 extending in opposite, diagonal directions away from the stylus coupling portion 28–1, inclined 45° to the horizontal record surface. The stylus coupler 28 also has two guide arms 28–3 pivotally joined by pivot junctions to the guided ends of the two drive arms 28–2, the other ends of the two guide arms being pivotally joined to each other and to a junction portion 28–4 which, in the form shown, serves to position the stylus coupler and the two transducers 21 in their operative position within the mounting or housing structure 30. Between the movable, forward end regions of the two transducers 21, is placed a generally cross-shaped elastomer body portion 25 which, together with the stylus coupler 28, serves to maintain the forward ends of the two transducers 21 in their movable, operative position in accordance with the motion components transmitted by the stylus 19 which is driven by the undulation sequences of the record grooves (FIGS. 1, 3 and 4).

The two transducers 21 with their elastomer bias body portions 23, 25 and the transducer coupler 28 are held in their proper operative positions by a mounting structure or housing 30 formed of two complementary housing walls 31, 61 (FIGS. 1–4). Housing wall 31 constitutes the bottom housing wall, and is shown in detail in FIGS. 13 to 13–H. The other complementary housing wall 61 constitutes the top wall, and is shown in detail in FIGS. 14 to 14–D.

The bottom housing wall 31 extends longitudinally under the two longitudinal transducers 21. Bottom housing wall 31 has upwardly-facing wall surfaces along which the two transducers 21 and all other operative components of the pickup are assembled in operative position on the bottom housing wall 31 before the top housing wall 61 is secured to the bottom housing wall 31 when completing the pickup assembly. The two transducers 21 are held aligned in their operative position by complementary, upwardly-facing housing wall surfaces 32, 33 (FIGS. 4 and 5). Along their rear and front ends, the upwardly-facing housing-wall surfaces 32 and 33 are slightly recessed, as indicated at 32–1, 32–2, for aligning and holding in operative positions, respectively, the rear elastomer body portions 23 of the two transducers 21, and the movable front portions of the two transducers 21, with the rearward and forward elastomer body portions 23, 25, respectively (FIGS. 2, 4, 5, 6, and 13 to 13–H).

The bottom housing wall 31 has a front wall 36 bounding the front end of the interior housing space or compartment of the housing 30. Front housing end wall 36 has a rearward mounting projection 37 shaped so as to enter and establish mounting engagement, as by frictional engagement, with a correspondingly shaped opening 28–5 of the upper junction portion 28–4 of the endless-link stylus coupler 28 (FIGS. 1, 4, 7, 13–A, 13–C and 13–D). Between the front end wall 36 and the transducer mounting walls 32 of the bottom housing 31, extends a transducer coupling compartment 38 which has an opening in downward direction for exposing the stylus coupling bottom 28–1 of the stylus coupler 28 and the stylus 19 held therein, to engagement with a played-back record groove.

At the rear end, the bottom housing wall 31 is provided with an upwardly-projecting rear end wall 41 bounding a rear end of the transducer compartment of the housing. Extending rearwardly from the rear housing end wall 41 is a hollow terminal mounting structure 45 separated by a compartment spacing 41–5 from the rear ends of the upwardly-facing transducer mounting walls 32 of housing wall 31. The hollow terminal wall portions 45 of rear end wall 41 surrounding an interior terminal compartment 45–6, have inwardly-facing terminal recesses 46 arranged to retain in operative position two sets of exposed terminal strips 21–1 which are connected to the two sets of electrodes of the two transducers 21, respectively, thereby enabling detachable connection of external operating circuits to the two transducers.

Referring to FIGS. 4, 7 and 8, in the specific form of invention shown, the two opposite guide arms 28–3 of the endless-link-chain stylus coupler 28 having coupling slits 28–6 shaped to establish operative coupling engagement, as by frictional engagement, with the movable front end of the two transducers 21 so as to impart to them their torsional transducer motion components and also to hold them assembled in operative position on the stylus coupler 28 as a unitary component assembly which may be placed and assembled in its operative position on the corresponding mounting and aligning surfaces of the bottom housing wall 31. FIGS. 1, 2, 4 and 5 show how this arrangement makes it possible to assemble the rearward elastomer bias portions 23 on the rear ends of each transducer unit 21 for holding in position the respective sets of two transducer terminal leads or strips 21–1 along the exterior terminal surfaces of the respective two transducer units 21, and thereafter inserting the front ends of the two transducer units 21 into the coupling and retaining slits 28–6 of the endless-link stylus coupler 28, and thereby completing the self-supporting sub-assembly unit shown in FIG. 4, wherein the two transducers 21 with their elastomer bodies 23 and their terminal strips 21–1 are held by the stylus coupler 28 as a sub-assembly unit which may be mounted as an entity in its operative position on the corresponding aligning portions or aligning surfaces of the bottom housing wall 31.

After completing the sub-assembly unit consisting of the stylus coupler 28 holding in operative relation the two transducer units 21 with their elastomer body portions 23 and 25, and their two sets of terminal strips 21–1, respectively, the entire sub-assembly is mounted in its assembled, aligned position on the exposed, inwardly-facing walls of the bottom housing unit, as follows: The aligning opening 28-5 of upper junction member 28-4 of the stylus coupler 28 is inserted with a relatively tight, frictional coupling fit over the rearward coupler mounting projection 37 of the front end wall 36 (FIGS. 1, 4, 7, 13, 13-A, 13-C and 13-D). This assembly operation also places the downwardly-facing surfaces of the two transducers 21 and of their elastomer body portions 23, 25 on their complementary, generally upwardly-facing aligning surfaces 32, 33, 32-1, 32-2 of the bottom housing wall 31. The lower and upper terminal strips 21-1 of each transducer 21 are then placed in the two sets of lower and upper passage slits 41-1, 41-2 of rear housing end-wall 41, respectively, being later placed in the inwardly-facing retainer recesses 46 of the hollow terminal wall portion 45 of the assembled housing 30.

The generally upwardly-facing aligning surfaces 32, 33, 32-1, 32-2 of the bottom housing wall 31, together with the rearward mounting projection 37 of front housing end wall 36, assure accurate aligned positioning of all components of this self-supporting transducer stylus coupler sub-assembly in their operative aligning surfaces of wall members 32, 33, 36 and 37 of the bottom housing wall.

The complementary upper housing wall 61 has complementary wall and surface portions shaped for complementary interfitting and abutting engagement with corresponding surfaces of the bottom housing wall member 31, and all the facing surfaces of the transducer assembly and its elastomer body portions 23, 25, previously assembled with the transducer coupler sub-assembly unit on the various aligning surfaces and portions of bottom housing member 31, for fixing the transducer assembly and all its operating elements in their required aligned, operative positions.

Referring to FIGS. 1, 4, 5, 6, 7 and 9, the upper housing wall 61 extends with two longitudinal side walls 62 along the longitudinal side walls of the bottom housing wall 31 so that the facing edge surfaces of the side walls of the two housing walls 31 and 61 meet and form a housing enclosure around substantially the entire internal operative component assembly of the pickup, including the two transducers 21, their elastomer body portions 23, 25, their rearwardly-extending terminal members 21-1, and all but the lower stylus coupling portion 28-1 of the stylus coupler 28.

In accordance with the invention, the bottom housing wall 31 and the complementary upper housing wall 61, have at each of their opposite ends a set of complementary end wall portions extending generally in a direction transverse to the major longitudinal axis of the housing, and each set of complementary end-wall portions has complementary end-wall-surface portions held by themselves—without rivets, bolts or other separate junction members—in junction engagement with each other to provide a closed housing for the assembled operative components of the pickup and to hold them in their aligned operative position within the closed housing. Furthermore, at least one wall portion of the two housing walls 31, 61 is elastically deformable for making it possible to temporarily deform it to a releasing position wherein at least one set of end-wall surfaces of the two housing walls is released from their junction engagement, thereby enabling separation of one housing wall from the other housing wall, and exposing the interior operative component assembly.

There will now be described one form of end-wall arrangement of two complementary housing walls of a pickup of the invention, which assures that they may be assembled into a joined, fixed housing structure surrounding all components of the pickup, without any distinct or separate junction elements, such as rivets, screws, bolts, or the like.

Referring to FIGS. 1 to 4, and detail FIGURES 7, 9, and 13 to 14-B, the front end of upper housing wall 61 is provided with aligning portions 63 shaped for interlocking engagement with complementary, interfitting front end-wall aligning portions 51 of front-end wall 36 of the bottom housing wall 31. The bottom housing wall 31 or the top housing wall 61 or both housing walls 31 and 61, are formed of elastically deformable and strong material, and they are both relatively rigid, although at least one of the two housing walls is elastically deformable from its normal or released condition. In the form shown, the aligning portions 63 of upper housing wall 61 constitute aligning projections 63 which have an aligning fit within aligning recesses 51 of the front end wall 36 of the bottom housing wall 31 (FIGS. 13-A, 13-D, 13-E, 14-A and 14-C). In addition, the front end of top housing wall 61 has an aligning recess 64 shaped for interfitting engagement with a rearwardly-extending wall projection 52 of bottom housing front-end wall 36 carrying the mounting projection 37 on which the stylus coupler 28 with its transducer sub-assembly unit is operatively retained on the bottom housing wall before joining the two housing walls 31, 61 into a closed housing, as described below.

The upper housing wall 61 (FIGS. 14, 14-A and 14-B) also has rear end surfaces 65 shaped for interfitting junction engagement with the facing end surface portions 53 of the rear end wall 41 of the bottom housing wall, so that when one of the two housing walls, for instance the bottom housing wall 31, is slightly elastically deformed so as to increase the distance between its two end walls 36 and 41, the released rear end wall 41 of the bottom housing wall 31 will maintain with its inward surface 53, strong frictional junction or locking engagement with the facing rear end surfaces 65 of the top housing wall 61 after the bottom housing wall has been released from the elastically deformed condition. In the form of the invention shown, the bottom housing wall 31 is made of elastically deformable material, and has an elastically deformable portion which may be deformed so as to increase the distance between or spread apart its front and rear end walls 36, 41 (FIGS. 13 to 13-C), so as to make it possible to retain the upper housing wall 61 in fixed, assembled, closed position along the bottom housing wall 31 by the frictional engagement of the facing end-wall surfaces of the bottom housing wall 31 and top housing wall 61. Alternatively, the upper housing wall 61 may be formed of elastically deformable material, so that it may be slightly compressed, for positioning its transverse end surfaces between the facing end-wall surfaces of the bottom housing member 31 and assure that upon releasing upper housing wall 61, its released elastic restoring forces will maintain strong frictional engagement with the facing end wall surfaces of bottom housing wall 31, and thereby retain the two housing walls in their assembled, closed position shown in FIGS. 1-3, 7 and 9. In the specific housing 30 shown, the rearward region of lower housing wall 31 extending between the downwardly-extending stylus retaining member 58 and the raised transducer-aligning wall section 32 are designed to permit elastic deformation thereof for elastically spreading apart the rear and front housing wall portions 41, 36 when assembling the bottom and top housing walls 31, 61, into the closed housing 30, as described above.

When the two housing walls 31, 61 are assembled around the operative component-assembly carried by the stylus coupler 28, which has planar shape, extending through the downwardly open housing front compartment, the upper junction or mounting member 28-4 of the stylus coupler is automatically retained and clamped in fixed position against the rearward surface of front end wall projection 52 carrying the coupler mounting projection 37 of bottom-housing, front end wall 36. This clamping engagement is maintained by the frontwardfacing rear edge surface of the top wall 61 having the aligning recess 64 which fits over the facing aligning projection 52 of front end wall 36 (FIGS. 1, 2, 4, 7, 13 to 13–D, 14, 14–A to 14–C).

The rear region of the top wall 61 has on its opposite sides, two interlocking recesses 65–1 formed in part by the rear junction surface 65 (FIGS. 14, 14–A) for interlockingly receiving the upwardly-projecting wall portions of housing end-wall 41 adjoining its central aligning recess 41–3 (FIGS. 13 to 13–C, 13–F, 13–G). The central region of top housing wall 61 has a downwardly-facing surface overlying the two transducers 21 and their elastomer bias portions 23, 24, as well as their forward bias portions 25. Along the rearward region, this downwardly-facing wall surface of upper housing wall 61 has downwardly-projecting, relatively rigid bias ridges 61–6, 61–8 shaped for compressive engagement with the underlying rearward elastomer bias bodies 23, 24 for maintaining the two transducers in the required elastomer-biased operative position (FIGS. 4, 14, 14–D). The forward region of the upper housing wall 61 also has an inward bias ridge 61–8 for applying compressive bias to the forward, cross-shaped elastomer bias portion 25 (FIGS. 4, 14 and 14–C). The central rear region of the top housing wall 61 has a downwardly-projecting interlocking projection 66–3 which has an aligning fit within aligning recess 43–3 of bottom housing wall 31, which aligning projection 66–3 has laterally-projecting shoulder portions 66–4 fitting over the edges of central aligning recess 43–3 of the adjacent rear-end-wall portions 41 of bottom housing wall 31 (FIGS. 14 to 14–C and FIGS. 13, 13–F and 13–G). This downward interlocking projection 66–3 of the top wall 61 serves thus to lock the four conductive transducer terminal strips 21–1 insulated from each other in the four separate terminal passage slits 41–1, 41–2 of the underlying portion of rear-end-wall 41.

In the specific form of the pickup of the invention shown, after the transducer sub-assembly unit comprising the stylus coupler 28 with the two transducers 21 and their elastomer body portions 23, 25, and the terminal strips 21–1, has been placed in operative position on the stylus-retaining projection 37, and on the transducer aligning surfaces 32, 33 of the bottom housing wall 31, the upper housing wall 61 may be joined in the closed position on the bottom housing wall 31, by the following procedure: With the rear end 69 of upper housing wall 61 raised, the upper edges of its front projections 63 are placed under the downwardly-facing wall edges of the end-wall recesses 51 of bottom housing wall 31 while the top housing wall 61 is held inclined above the bottom housing wall 31. Thereupon the rear end portion 69 of the top housing wall 61 is pushed or pressed forwardly against the so-engaged front end wall 36 of bottom housing wall 31, for elastically spreading the two bottom housing end walls 36, 41 apart from their normal released condition. With the two bottom housing end walls 36, 41 held spread apart, the still-raised rear end 69 of the top housing wall 61 moves downwardly into the closed-housing position of FIGS. 1 to 3, whereupon the two bottom housing end-walls 36, 41 are released from the elastically spread-apart condition, thereby causing their released end junction surfaces to establish strong clamping engagement with the facing end faces 65 of the top housing wall 61, which is now held elastically retained and interlockingly clamped in the closed-housing position.

The so-assembled, interlocked two housing walls 31, 61 provide the housing 30 which—as long as it remains thus interlocked and assembled—holds the two transducers 21 and their stylus coupler 28 in their operative positions. The rearwardly-projecting, narrower wall portion 45, 69 of the upper housing wall 61 forms a terminal section thereof which complements the terminal housing section 45 of the bottom housing wall 31 and provides in conjunction therewith a rearwardly open terminal compartment 45–5 having two additional terminal recesses 42 similar to the terminal recesses 42 of the bottom housing wall 31 described above (FIGS. 1, 4, 9, 13 to 13–C, 13–H, 14, 14–A and 14–B).

The rear housing portions 45, 66 of the assembled housing 30 enclose a terminal compartment 45–5 with a rearward opening through which may be inserted a relatively rigid, insulating, plug-like connector member (not shown) holding affixed thereto four metallic terminal portions of external circuit leads and being of a shape that has a retaining fit with the interior wall surfaces of terminal compartment walls 45, 66. A polarizing key slit 45–6 on a side wall portion of terminal compartment wall 45 (FIGS. 1, 9, 13–C and 13–H) is shaped to receive a corresponding polarizing key ridge of the external lead connectors, so that it may be inserted into the rearward terminal compartment 45–5 in a predetermined polarized position in which a predetermined external circuit lead will always be connected to a predetermined complementary transducer lead of the four transducer leads 21–1 that are exposed in the inward wall recesses 46 of the rearward terminal housing compartment 45–5.

In accordance with a phase of the invention, the four transducer leads 21–1—which lead from the two transducers 21 and provide along the interior of housing terminal compartment 45–5 exposed metallic terminals for establishing detachable circuit connections with metallic plug terminals of external circuit leads—are not made of stiff spring sheet metal, but of highly flexible, a very thin metal foil, so that they may be readily bent and trained to engage underlying wall recesses of terminal compartment 45–5, along which they are retained for contact engagement with exposed, spring-like metallic terminal strips of an external circuit plug (not shown) which is inserted in a polarized position within the terminal compartment 45–5 of housing 30. One of the rear housing wall portions 45, 66 forming the rear terminal compartment 45–5, namely housing wall portion 45, has a polarizing key slit 45–6 for receiving a laterally-projecting polarizing key of the external lead plug, so that it may be inserted into housing compartment 45–5 only in one polarized aligned position with respect to the four terminal strips 21–1 of the two pickup transducers 21.

In the pickup of FIGS. 1—14–C, each transducer 21 has two terminal strips 21–1 of highly flexible metal foil secured thereto—as by a conducting cement used on Rochelle salt crystal transducers—or held clamped thereto by its elastomer bias body 23. After joining the housing walls 31, 61 into closed housing 30 for holding in its interior the operative pickup assembly with its two transducers 21, their two pairs of metallic-foil transducer terminal strips 21–1 will extend through the four passage slits 41–1, 41–2 of upright housing-rear-end wall 41 (FIGS. 1, 2, 13, 13–C, 13–F to 13–H) into the rearwardly open terminal compartment 45–5. Each of the four long, foil terminal strips 21–1 is thereupon stretched and placed in proper sequence into overlapping engagement with the recessed wall surfaces of the respective four inward terminal recesses 46–5 of terminal compartment 45–5. Thereafter, the end portion 21–2 of each foil strip 21–1 is bent over and into overlapping engagement with transverse, recessed wall edge surfaces 59–5 of four axial recesses formed in the rearwardly-projecting, founded wall end portions 59, 69 of the two housing walls 31, 61 (FIGS. 1, 2, 9, 13, 13–H).

The stretched, strip-shaped transducer foil-lead end portions 21–2 are each clamped to the underlying transverse housing wall portions 59–5 by a common clamping structure of insulating material. There is provided to this end, a clamping collar 67 of elastically deformable or stretchable material such as a synthetic resin, which is placed over the wider, rearwardly-projecting end portions 59 and 69 of the bottom and upper housing walls 31, 61, respectively, the clamping collar 67, after being so elastically stretched and enlarged, being retained by its elastic restoring forces around the laterally-facing, forwardly-tapering surfaces of rearward housing end projections 59, 69. The forwardly-tapering lateral surfaces of housing rear-end-portions 59, 69 underlying correspondingly shaped surfaces of the elastically stretched clamping collar 67, cause this clamping collar 67 to firmly clamp the metallic terminal foil end-portions 21-2 to the underlying housing wall surface portion 59-5 over which they have been previously stretched and folded, so as to assure that the four transducer terminal foil strips 21-1 are held fixed in the interior terminal wall recesses 46 within the terminal compartment 45-5 of the housing 30. The rearward end surface of the retaining collar 67 is provided with a circular shoulder portion 68 providing a retainer surface whereby the rear end of the pickup is retained by a bracket in operative position within the tone arm, as described below.

The terminal clamping collar 67 of housing 30 serves also to prevent spreading apart of the two complementary wall portions of the terminal housing section 41 when the external lead plug carrying complementary metallic terminal portions of the external circuit leads is inserted into the hollow rear terminal compartment 45-5 of the terminal housing section, for establishing proper circuit connections to the opposite terminal poles of each of the two transducers 21.

The feature of the invention directed to a pickup the housing of which has a hollow rearward terminal compartment with longitudinal, metallic terminal strips exposed along different interior, angularly-displaced longitudinal compartment-wall surfaces, are of value not only in connection with pickup housings formed of two complementary housing walls, but also in connection with pickups formed with an integral housing having transducer terminals exposed at the housing end remote from the stylus, for instance of the type disclosed in connection with FIGS. 17 to 24 of U.S. Patent 2,934,610, or in the U.S. Patent No. 2,955,170 issued on Dieter and Bauer application Serial No. 733,680, filed May 7, 1958.

The stylus or styli 19 which transmit their undulatory movement through the stylus coupler 28 to one or more transducers 21, such as transducer 21 of the pickup, may be directly mounted on the stylus portion 28-1 of the stylus coupler 28. The stereophonic pickup of the invention has a stylus or styli 19 designed for ready interchange and replacement in the operative position on the pickup mounting structure of housing 30. To this end, the stylus portion 28-1 of the stylus coupler 28 is provided with a stylus-coupling recess 28-7 arranged for detachable coupling and transducer-driving engagement with the front end of a detachable stylus drive structure detachably held or retained in a retainer seat along the downward side of the pickup which faces the underlying surface of the groove-containing record member or disc.

In accordance with a phase of the invention, an elongated, detachable, self-supporting drive structure of a pickup of either the stereophonic or monophonic type, has a relatively stiff seating section of elastically deformable substance, with two elastically deformable side wall portions thereof biased to retain a predetermined normal seating width for retaining the stylus drive structure in its operative record-playing position within a stylus retainer seat of the pickup mounting structure or housing, and enable ready removal from or replacement of the stylus drive structure in its operative position on the pickup by inwardly deforming the two side walls portions of the drive structure as it passes through a narrow entrance width of the stylus retainer seat. Furthermore, in accordance with the invention, such stylus drive structure has two styli, and is arranged to be rotated or turned in the retainer seat of the pickup mounting structure or housing, so that it may be turned to and retained in two different stylus or groove-scanning positions, in which a stylus of different dimensions is retained in an operative groove-engaging, record-playing position.

One form of a novel, detachable stylus drive structure of the invention will now be described in connection with FIGS. 1, 2, 4, 7, and 9-12. The stylus drive structure generally designated 70 is of elongated shape, extending and retained along the axis thereof in a retainer seat 58-1 of a retainer structure 58 formed along the under side of the pickup mounting structure or housing 30. The elongated stylus drive structure 70 comprises a relatively thin, elongated, light-mass stylus holder portion 71 carrying at its front end two oppositely-directed styli 19. The rearward end of the thin, rod-like stylus holder 71 is carried and held in operative, flexible position by a coaxial, elongated seating structure formed of two seating portions 72 and an intermediate seating section 73. The seating section 73 of stylus drive structure 70 is shaped for detachable seating engagement with the retainer seat 58-1 along the downwardly-facing side of the bottom housing wall 31. The seating portions 72 and seating section 73 are of larger cross-sectional area than the thin stylus holder 71.

The stylus drive structure shown, carries at its front end two styli 19 of different dimensions, extending in different transverse directions relatively to the stylus drive rod 71, and the stylus drive structure is arranged to be rotated along its seating section or portion 73 for bringing either one of its styli 19 into groove-engaging, record-playing position. In the form of stylus drive structure 70 shown, the two seating portions 72 adjoining its seating section 73 form part of a laterally-extending handle 75 by means of which the stylus drive structure 70 may be turned from one stylus-playing position, wherein one of its styli 19 engages the record groove, to another or opposite stylus position in which the other stylus 19 engages the record groove, the two opposite stylus positions of the stylus drive structure 70 between indicated in FIG. 9 by the full-line and by the dash-line positions of the handle 75, respectively. In order to positively retain the stylus drive structure 70 in either one of its opposite stylus positions, the stylus-holder handle 75 is provided with a thin, web-like retainer portion 76 extending between the two handle arms of the handle 75 which merge into the seating portion 72 adjoining its seating section 73. The retainer portion 76 of the stylus drive structure 70 is elastically deformable in a direction transverse to its length, so that when bringing the stylus-holder handle 75 to either one of its opposite stylus playing positions, the web-like retainer portion 76 of the handle will be elastically deformed until it establishes interlocking engagement with a facing, interlocking portion of retainer member 58 of the bottom housing wall 31. In the form shown, the web-like retainer portion 76 is provided with an interlocking projection or dimple 77 arranged to enter into interlocking engagement with a recess or depression 78 in the facing outer surface of the stylus retainer member 58 of housing 30, the dimple recess 78 being shown in the side view of the bottom housing wall 31, as seen in FIG. 13-A.

The thin stylus holder 71 is arranged to be flexibly held in the wider seating structure 72 thereof, and may form a distinct unit having a polarized rear portion fitting and frictionally retained in operative position within a correspondingly shaped elongated, hollow interior space at the front end of the wider seating structure 72 thereof. In the form shown in FIGS. 1 to 4 and 9 to 12, the entire stylus drive structure 70 with its thin, flexible stylus holder 71, the relatively stiff seating structure 72 and the seating section 73, and the handle 75, is formed, as by a molding operation, of synthetic resin material, which gives the seating portions 72, the seating section 73 and the handle 75 the required stiffness or rigidity for enabling positive positioning of the stylus drive structure in its two operative positions within retainer 58 of pickup housing 30, corresponding to the full-line and dash-line handle positions 75 of FIG. 9.

In accordance with a phase of the invention, the handle 75 of the turnable stylus drive structure 70 is also utilized as a stylus guard for preventing damage to the stylus and/or to the pickup transducers when the tone arm with the pickup held therein is dropped or moved with excessive force against a horizontal structure underlying the pickup, such as the mounting board of the record turntable, or the record disc. In the form of the invention, one of the relatively rigid seating portions 72 of the stylus drive structure is provided with a raised, outward, interlocking projection 79 shaped for entrance into a correspondingly-shaped, inwardly-tapering reentrant housing recess for retaining the handle 75 of the stylus drive structure 70 by the housing 30, in the dash-line vertical, stylus-guarding position 75-1. Although the seating section 73 of stylus drive structure 70 is relatively stiff, it nevertheless has sufficient elasticity to permit slight deformation thereof within the elongated retainer seat 58-1 of retainer member 58 of bottom housing wall 31, when the stylus handle 75 is moved from one of its opposite stylus-playing positions to the vertical stylus-guarding position 75-1 of FIG. 9.

In accordance with another phase of the invention, a phonograph pickup is arranged to be retained in operative aligned position within the tone arm, without any special brackets that are secured to the pickup housing, by giving its opposite housing end walls aligning retainer portions which may be moved into the aligned operative position between two opposite mounting or arm sections of an integral, elastically deformable bracket member forming part of a downwardly-facing wall of the pickup-holding tone-arm portion.

Figure 2:
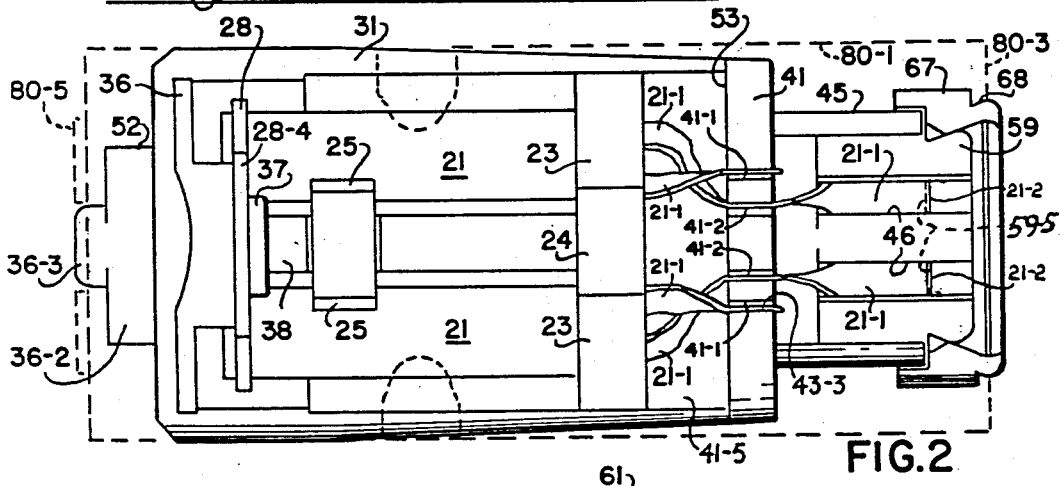
FIG. 2 is a top view of the pickup of FIG. 1, with the top housing wall removed to expose the interior operative components.

FIGS. 1, 2 and 15 to 15-B show one form of an integral bracket which permits such aligned, simple removal from and detachable mounting of the pickup in its operative aligned position on the tone arm. A bracket generally designated 80 is formed of an elongated, elastically deformable, relatively stiff sheet member of metal, for instance, having a central bracket section 80-1 and two end sections 80-2, 80-3 embracing the front end and the rear end of the underlying pickup housing 30. The central bracket section 80-1 underlies and is suitably secured to the downwardly-facing overlying wall of a tone arm, as by means of rivets or bolts, or plastic locking projections of the tone arm extending through locking openings of the central bracket section 80-1 and joined thereto as by heat-sealing, in overlapped position over the adjoining portions of bracket wall section 80-1.

The central bracket section 80-1 is given greater rigidity by forming in its sheet metal a longitudinal rib 80-4, as seen in FIGS. 1 and 15. The front bracket section 80-2 has a reentrant wall portion which is provided with a transversely-extending, outwardly-bent retainer-aligning recess 80-5 and a longitudinal, vertical retainer-aligning slot 80-6, for retaining in aligned position therein the rib-like aligning projection 36-2 of bottom housing wall 36 and its forward, interlocking and aligning projection 36-3 (FIGS. 1, 2, 13, 13-A, 13-B and 13-E). The rearward bracket section 80-3 has two sheet arms 80-7 and embraces with its circular sheet edge surfaces the recessed circular aligning surface portions 68 of the rear housing collar 67 of pickup housing 30, for retaining in aligned position the rear end of the pickup housing 30. With such arrangement, although the front arm section 80-2 and the rear arm section 80-3 of bracket 80 are relatively stiff, they permit their elastic deformation for spreading them apart and seating between them in aligned position the pickup housing 30 with the front housing aligning projections 36-2, 36-3 held interlocked and aligned within the locking recess 80-5 and locking slot 80-6 of the front bracket section 80-2, and the rearward pickup housing collar 67 held interlocked within the circular edge surfaces of rear bracket section 80-3 and its side arms 80-7. The rear bracket section 80-6 also has struck out therefrom two retainer tongues 80-8 which overlie and are maintained in elastic engagement with the underlying surface portions of rear housing collar 67.

With such bracket, the pickup housing 30 may be readily removed from or mounted in its operative aligned position in the tone arm, for instance by the following insertion procedures. The forward-projecting, front-aligning and retainer portions 36-2 and 36-3 of housing front end wall 36 are positioned within the transverse recess 80-5 and the vertical slot 80-6 of front bracket section 80-2, while the rear end of the pickup housing 30 is held tilted in inclined position along the downward ends of the rear bracket arms 80-7. Thereupon the rear end of the pickup housing 30 is pushed in forward direction, thereby spreading the front bracket arm section 80-2 apart or away from the rear bracket arms 80-7 until the rear aligning and seating recess 68 of the housing rear-end collar 67 is able to enter within the circular seating and aligning edges of the rear bracket section 80-3, as seen in FIGS. 1, 2 and 15 and 15-A. By a similar, reversed procedure, the pickup may be readily removed from its bracket 80.

The principles underlying the detachable stylus drive structure of the invention described in connection with FIGS. 1 to 9 and detail FIGS. 11 and 12, will suggest various other modifications thereof. One form of such modified stylus drive structure embodying additional features of the invention, will be described in connection with FIGS. 16-22. FIG. 16 shows the bottom region of a pickup housing 100 which encloses an operative assembly of pickup components, such as described above in connection with FIGS. 1-9, and having a stylus-transducer coupler 28 with a recessed stylus-coupling downward portion 28-1 arranged for detachably coupling thereto the forward flexible stylus rod of a stylus drive structure of the general type described above in connection with FIGS. 10 to 12.

The pickup of FIG. 16 is designed for operation with a different type of turnable stylus drive structure 90 of the invention, which is shown in detail in FIGS. 20 to 22. The pickup housing 100 is provided on its downwardly-facing wall surface with two axially-spaced, downwardly-projecting retainer members 81 having coaxial interior rotary or cylindrical guide seats 82 within which two coaxial rotary or cylindrical seating sections 91 of the elongated transducer drive structure 90 are rotatably seated and retained for rotation about their longitudinal axis. The two cylndrical seating sections 91 of stylus drive structure 90 form portions of an elongated seating member 92 of the stylus drive structure 90, extending between a front portion 93 and a rear portion 94 thereof, which are of different cross-sectional area than the central seating member 92 with its two turnable, cylindrical seating sections 91. By making the seating member 92 or its two seating sections 91 of different cross-sectional area than its two end portions 93, 94, the transverse surfaces along which the end portions 93, 94 adjoin the seating member 92 provide axial aligning surfaces for aligning the axial position of the stylus drive structure 90 relatively to facing transverse aligning surfaces of the housing retainer members 81 of the phonograph pickup housing 100, and fixing the operative position of the styli 19 carried at the front end of the stylus drive structure 90.

A thin stylus-rod 95 carrying at its front end the two differently-directed styli 19, has a rear end portion held suitably affixed within the interior of the front seating portion 93 of the stylus seating member 92 to permit flexing of the stylus-rod 95 in accordance with the stylus undulations. Each of the two housing retainer members 81 is provided with a gate entrance 93 of smaller width than the diameter of its cylindrical seating surface 82. The two cylindrical seating sections 91 of the stylus seating structure are made of elastically deformable material, and designed so as to permit elastic deformation of their side-wall portions from their normal width corresponding to their cylindrical shape, to a narrower width which permits them to pass through the narrower gate entrance 83 of the housing retainer members 81 into their wider cylindrical seating and guide surfaces 82 for removing from or replacing the detachable stylus guide structure 90 in its operative position on the pickup housing 100. Each of the two axially-aligned housing retainer members 81 has transverse outer aligning surfaces shaped for aligning engagement with the inwardly-facing transverse surface portions of the two end portions 93, 94 of the turnable stylus seating member 92 of the stylus drive structure, when it is placed in operative position in the retainer seats 82 of the housing retainer members 81.

Seating member 92 of the stylus drive structure 90 is made of elastically deformable material of substantial stiffness or rigidity, and each of its two seating portions 91 has a slit 96 aligned with their central plane (FIGS. 21, 22) for enabling elastic deformation of the side-wall portions bordering the respective slit 92 when the seating sections 91 are moved or passed through the narrow gate opening 83 into the wider rotary seats 82 of the housing retainer members 81 which fix the operative position of the stylus drive structure 90 and its styli 19 relatively to the cooperating elements of the pickup.

Such slit arrangement makes it possible to insert or remove the seating sections 91 of the seating structure of the stylus drive structure 90 through the narrow gate opening 83 into the wider seat surface 82 of the housing retainer member 81, by moving the seating member 92 with the two centrally split sections 91 of the stylus drive structure 90 through the narrower retainer opening 83 into the cylindrical housing retainer seats 82, in the direction of the plane of the slits 96 formed in the seating sections 91, in a manner analogous to corresponding operations of inserting or removing the slitted seating section 73 of stylus drive member 70 of FIGS. 10 and 11, into or from the rotary seating surface of the retainer member 58 of the pickup housing 30 of FIGS. 1 to 9.

The stylus drive structure 90 is rotated to its different opposite stylus playing positions by a laterally-extending handle member 97. The handle 97 has an outer grip portion which is connected by two handle arms 98 to intermediate, axially-spaced portions of seating member 92 adjoining its two slitted, compressible seating sections 91 (FIGS. 20 to 22). The two handle arms 98 may form an integral part of the seating member 92 with its seating sections 91 and end portions 93, 94 of the stylus drive structure 90, and made, for instance, by molding, of relatively rigid but elastically deformable synthetic resin material. Each of the two handle arms 98 has outwardly-extending stop projections 98-1 which come into engagement with a facing stop surface 100-1 on the underside of pickup housing 100 when the stylus drive structure 90 is turned by the handle 97 from one stylus playing position to the opposite stylus playing position, in each of which positions the handle 97 extends laterally substantially perpendicular to the vertical plane through the longitudinal axis of the elongated stylus drive structure 90.

Means are also provided for assuring that when turning the stylus drive structure 90 from one playing position to the opposite playing position, it will automatically be brought to the desired end of its turning motion and the proper playing position after it starts approaching the same. In accordance with the invention, the outer surfaces of the two side arms 93 of the grip which are axially farthest apart along the axis of the stylus drive structure, are shaped for driving engagement with complementary, specially-shaped retainer-bias surfaces of housing retainer members 81, for causing the elastically deformable handle arms 98 to be elastically deformed so as to enter a narrower bias spacing of the retainer bias surfaces as they approach their stylus end position on the pickup housing, the elastic restoring forces of the inwardly deformed handle arms 98 establishing driving engagement with complementary retainer bias surfaces which turn the handle 97 and its stylus drive structure to their final stylus playing position toward which they have been turned.

In the form of the invention shown, the axially-spaced end regions of the two housing retainer members 81 of the pickup housing 100 are provided with two sets of spaced, oppositely-directed, laterally-extending bias walls 85. Each set of bias walls 85 of the pickup housing 100 extends in a direction transverse to the vertical central plane of the pickup housing and its stylus drive structure 90, and they have downwardly-converging-bias surfaces 86 shaped for biasing engagement with the outer surfaces of the two spaced, elastically deformable arms 98, for elastically forcing them closer together when they are moved past the narrower bias entrance between the downward edges 87 of the bias walls 85, as seen in FIGS. 16 and 17. Having once moved past the narrow bias entrance between downward edges 85, the two handle arms will be driven apart by their elastic restoring forces, which will move them along the upwardly divergent bias surfaces 86 of the set of two bias walls 85 to their inward, final operative position in which they are shown in FIG. 16, wherein they are retained by their elastic restoring forces. In other words, on turning the stylus drive structure 90 with its grip handle 97 from one stylus end position to the opposite end position, the two opposite handle-grip-arms 98 have to move along the convergingly-tapered bias surfaces 88 of the facing gate walls 85 of the housing retainer members between which it is held, thereby causing elastic deformation of the two handle arms 98 as they pass from the deepest position between the two converging bias wall surfaces 86 toward and through the narrower entrance edge spacing between the bias surfaces. Once the handle arms 98 pass through the narrow bias surface 87, the handle 97 with its stylus drive member 90 may be freely moved until the two deformable handle arms 98 start entering the narrow bias surface entrance 87 of the housing retainer members 81. On further movement of the handle arms 98 in a vertical direction, as seen in FIGS. 16, 17, the two handle arms 98 are inwardly deformed towards each other until they pass the narrow bias entrance 87 between the two inwardly-diverging bias surfaces 86 of the set of two bias walls 85 of the two housing retainer members 81. Thereafter, the elastic restoring forces of the two inwardly compressed handle arms 98 cause them to spread apart and moves the handle 97 together with the stylus drive structure 90 in the inwardly-divergent bias surfaces 86 of the two bias wall sets 85 to the final handle position 87 wherein its stylus drive structure 90 is in the desired opposite playing position.

The handle 97 of the stylus drive structure 90 of FIGS. 16-22 serves also as a stylus guard for preventing damage to the stylus 19 and/or to the pickup transducers when the pickup is dropped or moved with excessive force against an underlying horizontal surface such as a record disc. In the form of the invention shown, end portion 94 of the stylus seating portion 92 has an outwardly-tapering locking projection 99 shaped to engage and become elastically interlocked with a correspondingly shaped locking recess 89 formed on the downwardly-facing wall surface portion of pickup housing 100. The seating rod 92 of the stylus drive structure 90, although relatively stiff and rigid, has sufficient elastic deformability in its vertical handle position to permit slight flexing of the seating rod 92, as its tapered locking projection 99 enters the central housing locking recess 89 for retaining or locking the handle 97 in a vertically downward position on the pickup housing 100, wherein it operates as a stylus guard. Only a relatively small force is necessary for turning the handle 97 from its vertically-downward stylus guard position to one or the other of its opposite, laterally-projecting, stylus playing positions on the pickup housing.

Alternatively, seat border portion 94 or seat border portion 93 of the stylus drive structure 90 may be provided with an axially-extending, reentrant, inwardly-tapering locking recess for establishing elastic interlocking engagement with a correspondingly shaped, downwardly-projecting, complementary locking ridge of the overlying central region of the downwardly-facing wall surface of pickup housing 100.

The stylus drive structure described above in connection with FIGS. 16–22, may be readily removed from or inserted into its operative position on the pickup housing 100 in a manner analogous to that described in connection with the insertion or removal of the stylus drive structure 70 from its rotary retainer seat in the retainer member of pickup 30 described in connection with FIGS. 1 to 14–B. Thus, for example, the following procedure may be used for inserting the stylus drive structure 90 in its operative position on the pickup housing 100 of FIG. 16. With the pickup lifted, the grip 97 of the stylus drive structure 90 is gripped between the fingers and held in a vertical plane coaxial with the vertical plane of the pickup housing as seen in FIG. 16. While so held, the two seating sections 91 of stylus seating rod 92 are placed coaxially opposite the respective two narrow gate entrances 83 of the two housing retainer members 81. Thereupon one or both of the split seating sections 91 of the stylus drive structure 90, are moved inwardly through the narrow retainer gate openings 83 through which they pass by permitting their split side-wall portions to be deformed to the narrower width of the gate entrances 83 until they are released to normal cylindrical shape upon reaching the wider cylindrical seating surfaces 82 of the two housing members 81, wherein they are held rotatably seated along the cylindrical seating surfaces 82 of the two housing retainer members 81.

If the stylus drive structure 90 is left in the seating surfaces 82 of the housing retainer members 81 with the handle 97 remaining in the vertical plane of the pickup, the handle will serve as a stylus guard for the pickup. By turning the handle 97 to the right or left from such vertical stylus-guard position, it may be brought to either one of the opposite stylus playing positions, with the handle extending in a direction substantially perpendicular to the vertical axial plane of the pickup.

In order to enable those skilled in the art to readily practice the invention, and without thereby limiting its scope, there are given below, further data relating to phonograph pickups of the invention:

The pickup described in connection with FIGS. 1 to 15–C is designed for operation with two conventional piezoelectric crystal transducers about ⅝" long and 3/16" wide. The largest lateral diameter of the front region of the housing 30 is ⅝". The total length of the housing without its front projection 36–2 is 1¼", and it is made of commercially available, medium-impact styrene resin. The turnover stylus drive structure of FIGS. 10–12 has sapphire styli; a flexible front portion 71, .500" long, of circular cross-section .020" in diameter; its seating section 73 is of circular cross-section, .070" in diameter, and .265" long, and it is made either of nylon resin or of an acetate resin that is available under the trade-name "Delrin."

When the pickup operates with a tracking pressure of 9 to 11 grams, it has a stylus compliance of $1 \times 10^{-6}$ centimeter/dyne, and its transducers deliver an output voltage of 2.5 volts. When the pickup operates with a reduced tracking pressure of 6 to 8 grams, it has a stylus compliance of $2 \times 10^{-6}$ centimeter/dyne, and each of its two transducers delivers an output of 1 volt. The pickup of FIGS. 1 to 15–c may be operated with other types of transducers, for instance, with piezoelectric ceramic transducers arranged, for instance, in the same way as the two piezoelectric transducers 21 described herein.

The turnable stylus drive structures of the invention, of the type described in detail in connection with FIGS. 10 to 12 and 20 to 22, are also desirable for use in applications wherein a single stylus only is required for playing back one type of groove undulations. In such applications, the stylus drive structure having only one stylus is releasably locked by its locking portions in its operative stylus-groove-engaging position. A limited force applied to the handle of such turnable stylus drive structure is sufficient for turning it 90° from the groove-engaging position to a stylus-guard position wherein it is again releasably locked by its locking portions. In this 90° displaced stylus guard position, the stylus drive structure may be removed from the pickup retainer seat by withdrawing its elastically deformable, slitted seating portions through the narrow gate portions of the pickup retainer seat, in a manner analogous to that described above.

There will now be described an example of modified form of self-supporting stylus drive structure of the invention which is arranged to be detachably coupled in its operative position on the pickup.

As an example, referring to details FIGS. 13–C and 13–G of the pickup housing (FIGS. 1 to 14–D) and detail FIGS. 20 to 22 of its replaceable stylus drive structure 90, it may be modified as follows: The sealing section 91 of stylus drive structure 90 is made without the slot 96. Instead, the side wall segments of the stylus-drive-structure seating section 91 is made with flattened exterior side surfaces 91–2 extending parallel to the plane of the slot 96 (but without it). These two exterior parallel side surfaces provide the so modified seating section 90 with a width 91–2 slightly greater than the width of the gate opening 58–2 through which it has to be moved for seating it in the retaining recess 58–1 of the pickup housing. The so shaped seating section 91 of stylus drive structure 90 and the retainer recess projection 58 of housing wall 31 are made of elastically deformable material, such as synthetic resin, which allows their elastic deformation and subsequent restoration of their normal position and width, so as to permit the slightly wider seating section 91 to be passed with its flat side-wall segments 91–2 through the slightly narrower recess gate opening 58–2 when moved therethrough and to be thereafter retained within the seating recess 58–1 wherein holds the stylus drive structure 90 in its operative position in the pickup. As an example, good results are obtained with such stylus drive structures and recess bodies made of acetal resin sold under the trademark Delrin wherein the cylindrical seating section 91 of the stylus drive structure 90 of .070 inch diameter has flat side wall segments 91–2 of .061 inch width. The pickup recess structure has a gate opening of .055 inch width or in general, with its width being 10% to 15% greater than the gate opening width. The seating section 73 of the stylus drive structure 70 of FIGS. 10–12 may be similarly modified.

It will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described herein.

The embodiments of the invention in which an exclusive privilege or property is claimed are defined as follows:

1. A replaceable stylus holder for insertion through an elongated recess opening of narrow width into a wider parallel elongated seating recess between two retainer-recess wall portions of a phonograph pickup and driving mechano-electric transducer means thereof, which stylus holder comprises an elongated stylus rod member arranged for detachable operative coupling to said transducer means and having a front end carrying at least one stylus extending in an axial plane of said rod member and, a generally parallel, relatively stiff elongated seating member having a front seating end joined to the rear end of and carrying said rod member, a handle formed integrally with and extending from said seating member in a handle plane inclined by a material angle to said axial plane for rotating said stylus holder about its axis to a groove-engaging stylus position, said seating member having two axially spaced body portions and an elongated seating section rotatable in the pickup seating recess and of different cross-section circumference than said body portions for aligning the axial position of said seating member relatively to said retainer-recess wall portions, said elongated seating-member section having two opposite insertion wall segments extending generally parallel to said handle plane and having greater normal transverse width than said retainer-recess opening for retaining said stylus holder in said recess with said insertion wall segments extending generally parallel to said axial plane, said two insertion wall segments having the property of being elastically compressible from said normal width to the narrower width of said recess opening for passing therethrough in the direction of said handle plane, said seating member having two other opposite wall segments extending generally parallel to said axial plane and having materially greater resistance against compression than said two insertion segments, said other wall segments cooperating with the retainer recess wall portions for suppressing removal of said seating member from said seating recess in the stylus operative position.

2. In a replaceable stylus holder as claimed in claim 1, said handle merging into said two greater-width spaced body portions of said seating member.

3. In a replaceable stylus holder as claimed in claim 1, said handle merging into a portion of said seating member extending between and spaced from said two greater-width spaced body portions, said seating member having two generally similar seating sections extending on opposite sides of said handle between said handle and said two spaced body portions, respectively.

4. In a replaceable stylus holder for a phonograph pickup as claimed in claim 1, said stylus holder having two styli extending in generally opposite directions in said axial plane, said handle plane being inclined substantially 90 degrees to said axial plane.

5. In a replaceable stylus holder for a phonograph pickup as claimed in claim 1, said plastic handle having elastically deformable locking portions integrally formed with said handle, said locking portions comprising an elongated member supported at its opposite ends and an exposed intermediate region elastically deformable by engagement with complementary pickup lockup portions, said locking portion maintaining with its elastic restoring forces said stylus holder in its desired stylus position by engagement with the pickup lockup portions.

6. In a replaceable stylus holder as claimed in claim 5, said handle merging into said two greater-width spaced body portions of said seating member.

7. In a replaceable stylus holder as claimed in claim 5, said handle merging into a portion of said seating member extending between and spaced from said two greater-width spaced body portions, said seating member having two generally similar seating sections extending on opposite sides of said handle. between said handle and said two spaced body portions, respectively.

8. In combination with a phonograph pickup having mechano-electric transducer means and a plastic mounting body of solidified plastic substance for holding said transducer means, with said mounting body having two plastic retainer-recess wall portions formed integrally with said mounting body and bordering opposite sides of an elongated seating recess with an entrance opening narrower than said elongated seating recess, a replaceable stylus holder detachably held in said seating recess and comprising an elongated stylus rod member arranged for detachable coupling to said transducing means and having a front end carrying at least one stylus extending in an axial plane of said rod member and a generally parallel, relatively stiff elongated seating member having a front end carrying said rod member a handle formed integrally with and extending from said seating member in a handle plane inclined by a substantial angle to said axial plane for rotating said stylus holder about its axis to a groove-engaging stylus position, said seating member having two axially spaced body portions and an elongated seating section extending between said body portions and rotatable in the pickup seating recess and of different cross-section circumference than said body portions for aligning the axial position of said seating member relatively to said retainer-recess wall portions, said elongated seating-member section having two opposite insertion wall segments extending generally parallel to said handle plane and being of greater normal transverse width than said retainer-recess, said plastic recess wall elements and said plastic seating wall segments having the property of being elastically deformable from their normal positions for passing said two insertion wall segments in the direction of said handle plane through said narrower mounting-body entrance opening into said wider recess, said seating member having two other opposite wall segments extending generally parallel to said axial plane and having materially greater resistance against compression than said two insertion wall segments, said other wall segments cooperating with the retainer recess wall portions for suppressing removal of said seating member from said seating recess in the stylus operative position.

9. In the combination of a phonograph pickup with a replaceable stylus holder as claimed in claim 8, said plastic handle having elastically deformable locking portions integrally formed with said handle, said locking portions comprising an elongated member supported at its opposite ends and an exposed intermediate region elastically deformable by engagement with complementary pickup lockup portions, said locking portions maintaining with its elastic restoring forces said stylus holder in its desired stylus position by engagement with the pickup lockup portions.

References Cited by the Examiner

UNITED STATES PATENTS

| | | | |
|---|---|---|---|
| 2,699,470 | 1/55 | Koren | 274—37 X |
| 2,848,559 | 8/58 | Palo | 179—100.41 |

IRVING L. SRAGOW, *Primary Examiner.*